United States Patent [19]

Cone

[11] E Re. 31,357

[45] Reissued Aug. 23, 1983

[54] GLASS NOZZLE ARRAY FOR AN INK JET PRINTER AND METHOD OF FORMING SAME

[75] Inventor: Donald R. Cone, Palo Alto, Calif.

[73] Assignee: The Mead Corporation, Dayton, Ohio

[21] Appl. No.: 127,679

[22] Filed: Mar. 6, 1980

Related U.S. Patent Documents

Reissue of:

[64] Patent No.: 4,112,436
Issued: Sep. 5, 1978
Appl. No.: 771,523
Filed: Feb. 24, 1977

[51] Int. Cl.[3] ..... G01D 15/18; B23P 17/00

[52] U.S. Cl. ..... 346/75; 346/140 R; 346/1.1; 29/417

[58] Field of Search ..... 346/139 C, 1, 140 IJ, 346/75; 29/157 C, 411, 417

[56] References Cited

U.S. PATENT DOCUMENTS

| | | | |
|---|---|---|---|
| 2,266,349 | 12/1941 | Wempe . | |
| 3,156,950 | 11/1964 | Walton Jr. . | |
| 3,693,185 | 9/1972 | Lloyd | 346/139 C |
| 3,754,882 | 8/1973 | Van Esdonk et al. . | |
| 3,798,756 | 3/1974 | Bauerlen | 346/139 C X |
| 3,808,675 | 5/1974 | Iiyama | 346/139 C UX |
| 4,019,886 | 4/1977 | Hoffman | 346/140 |
| 4,047,184 | 9/1977 | Bassous et al. | 346/140 R X |
| 4,047,186 | 9/1977 | Kendall et al. | 346/140 R |

*Primary Examiner*—George H. Miller, Jr
*Attorney, Agent, or Firm*—Biebel, French & Nauman

[57] ABSTRACT

A glass nozzle array for use in an orifice plate or charge plate in an ink jet printer is formed with a plurality of glass tubes aligned parallel to one another and cemented in epoxy between two parallel glass plates. This glass nozzel array is formed by aligning a plurality of very small inside and outside diameter glass tubes on spaced supports of oriented silicon which are etched to form the grooves to properly align the glass tubes, a plate of glass is then positioned below the tubes and an epoxy resin poured through the tubes onto the glass and a second plate of glass is placed above the tubes to form a sandwich which upon curing is sliced orthagonal to the tubes to produce wafer thin glass nozzle arrays with glass support pieces for rigidity. The assembly is then adhered to a rigid backing plate to form either an orifice plate or a charge plate for an ink jet printer.

20 Claims, 7 Drawing Figures

GLASS NOZZLE ARRAY FOR AN INK JET PRINTER AND METHOD OF FORMING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to glass nozzle arrays and the method of producing them, and more particularly, to glass nozzle arrays of the type usable in an ink jet printing apparatus as orifices in an orifice plate or holes in a charge plate assembly.

2. Prior Art

Ink jet printing apparatus of the type in which the present invention is intended to be utilized, produce a plurality of uniform drops aligned parallel to one another and perpendicular to the movement of paper or other material upon which printing is to be effected. The printing is produced by using a reservoir of printing fluid (herein referred to as ink, but which can have varying compositions as is well known in the art) with a plurality of parallel aligned orifices at the bottom of the reservoir. through which the fluid is ejected or permitted to flow at a predetermined rate and in such a manner as to produce drops of fluid at the ends of filaments of the ink which pass through the orifice. These drops are then selectively charged or not charged as they pass through holes in a charge plate and are subsequently caught in a catcher or deposited on the material which is being printed.

Two somewhat distinct methods have been developed for generating the filaments and uniform drops which stem from the orifices. The first is the use of a vibrating orifice plate such as that disclosed in U.S. Pat. No. 3,739,393, in which a mechanical stimulator causes uniform vibration through a relatively thin orifice plate so that movement of the orifice plate causes droplets to be uniformly produced at the ends of the filaments extending from the orifices, in a well known manner. The second method is in the utilization of a vibrating plate above the liquid reservoir in contact with the liquid and parallel to a relatively thick and rigid orifice plate so that the ink is pushed through the orifices under pressure created by uniform vibration of the vibrating plate acting on the liquid. Such a method is disclosed in U.S. Pat. No. 3,900,162.

The present invention is directed more particularly to the latter type of ink jet printing apparatus in which the orifice plate is intended to be relatively rigid.

Economical methods of forming the orifices in the orifice plate or holes in the charge plate are difficult to find since the nature of the system requires the use of extremely small diameter holes in these plates. For example, the orifices in the orifice plate are generally in the range of 0.0005 to 0.0015 inch in diameter and the holes in the charge plate are generally in the range of 5 to 10 mils in diameter. In the past, this has required very expensive, time consuming and exotic methods of manufacturing orifice plates and charge plates having uniformly spaced and uniform diameter orifices ahd holes, respectively.

Exemplary systems include those such as disclosed in "IBM Technical Disclosure Bulletin" Volume 13, No. 11, page 4146, dated May 1976, in which an aluminum oxide block of material is compressed or formed about a plurality of parallel spaced wires and the wires are then subsequently etched out of the material to produce the desired diameter holes or orifices, and such a system as is disclosed in "IBM Technical Disclosure Bulletin" Volume 17, No. 11, page 3269, dated April 1975, in which a plurality of relatively large outside diameter glass tubes are ground to rectangular configuration, then drawn to reduce the inside diameter of the tubes and subsequently packaged in a bundle and heated to effect bonding between blocks by melting the glass. Such methods are very expensive and difficult to perform.

Another example of an attempt to produce such a construction is given in German Pat. No. 2,555,295 in which a method of forming a single nozzle from the glass tube is disclosed, in which a single glass tube is placed in a ceramic housing, the housing is then filled with glass and heated to cause bonding of the assembly with subsequent slicing to produce the wafer-thin nozzle portion. However, this is only directed to production of a single nozzle and not multiple aligned nozzles as is the present invention.

A further prior art process is disclosed in U.S. Pat. No. 2,996,419, in which a plurality of glass tubes are merely stacked parallel in a container and then the container is filled with an epoxy and metal mixture which is then cured. However, this system would not be appropriate for producing parallel aligned glass nozzle arrays of the type to which the present invention is directed.

SUMMARY OF THE INVENTION

The present invention overcomes the above described difficulties and disadvantages associated with the prior art devices and methods of manufacturing the same, by providing a relatively simple and economical means of producing a glass nozzle array satisfactory for use in orifice plates and charge plates of ink jet printing apparatus.

The glass nozzle array of the present invention basically comprises a plurality of parallel aligned glass tubes sandwiched between two pieces of also parallel aligned glass plates, with an epoxy resin between the plates and surrounding the glass tubes. Galss tubes for use as orifices in an orifice plate or for providing holes in a charge plate, both having the necessary diameters and appropriate spacings can be formed into this construction.

A novel method has also been devised for producing this assembly. A plurality of glass tubes having the appropriate inside diameter are first obtained, which can be most easily and economically effected by purchasing larger diameter glass tubing of commercially available material. The tubing is then heated and drawn to the appropriate inside diameter.

For example, commercially available glass tubing having a 0.2 inch outer diameter and a 0.02 inch inner diameter can be drawn at a ratio of approximately 20:1 reduction, to produce the desired inside diameter of approximately 0.001 inch for orifices in an orifice plate. The same procedure can be used for producing glass nozzle arrays for use in a charge plate. Also, it is desirable to chose the outside diameter of the commercial tubing so that when it is drawn it will be compatable with the spacing in the mounting wafers described below.

Next, a 100 orientation silicon wafer is selectively etched in a well known manner to form a plurality of parallel V-grooves in the wafer of the desired pitch in order to hold the glass tubes in parallel relation with the desired distance between centers of the tubes. The wafer is then split after preparation to form a pair of glass tube support wafers. The pair of silicon support wafeers are then secured to a frame in spaced relation in a horizontal plane so that the V-grooves are properly aligned and a piece of glass plate is positioned below where the tubes will lie when placed in the V-grooves; preferably with a space between the tubes and the glass plate. Epoxy resin is then applied to the tubes and the glass plate to entirely cover the tubes and fill the interstices therebetween and to fill the space between the tubes and the glass plate. A second glass plate is then placed above the tubes in spaced relation thereto and parallel to the tubes and the first glass plate, and in contact with the epoxy resin.

The assembly is then clamped and allowed to cure so that the epoxy resin binds the two glass plates and the tubes into a sandwich-like assembly. This assembly is then sliced wafer-thin to the desired thickness, with the slices being orthogonal to the longitudinal axis of the glass parallel support plates separated by epoxy resin and an array of parallel aligned glass nozzles supported in the resin between the two plates.

This nozzle array is then ground smooth and secured to a rigid backing plate in such a manner that it is in sealing engagement with the backing plate so that ink will only flow through the nozzles and not between the backing plate and the edges of the glass nozzle array. This procedure can be used for production of both the orifice plate and the charge plate.

DETAILED DESCRIPTION OF THE PREFERRED EMBODIMENT

Figure 1:
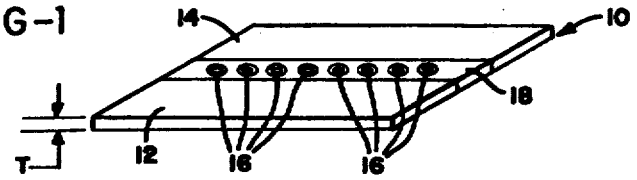
FIG. 1 is a pictorial illustration of a preferred embodiment of the glass nozzle array of the present invention.

The glass nozzle array 10 of the present invention is illustrated in FIG. 1. It basically comprises a pair of parallel spaced glass plates 12 and 14, a plurality of glass tubular nozzles 16 disposed in spaced parallel relation between and parallel to glass plates 12 and 14, all of which is held together by an epoxy resin portion 18 completely surrounding nozzles 16 and securely adhered to both the nozzles and glass plates.

This assembly can be used for the nozzle array of either a charge plate or an orifice plate of an ink jet printer, depending upon the diameter of the openings in nozzles 16 and the thickness T of the glass nozzle array 10.

In order to be utilized as a glass nozzle array on an orifice plate, the thickness T should preferably be in the range of about 0.0005 to 0.005 inch, with the diameters of the orifices in glass nozzles 16 preferably in the range of 0.0005 to 0.0015 inch, in order to produce the proper flow of ink through the nozzles 16. The actual thickness T of the glass nozzle array 10, however, will vary dependent upon many factors including, the viscosity of the ink, frequency of vibration of the fluid and velocity of the fluid through the orifices.

When the glass nozzle array 10 is to be utilized as a portion of a charge plate assembly, the thickness T will generally be in the range of 0.020 to 0.050 inch and the diameter of the holes in nozzles 16 will be generally in the range of 0.005 to 0.010 inch. With the exception of these differences in size, the construction of the glass nozzle array 10 for use in either an orifice plate or a charge plate is the same.

Figure 2:
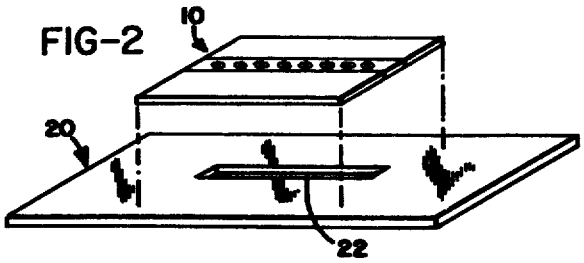
FIG. 2 is an expanded pictorial illustration of the glass nozzle array of the embodiment of FIG. 1 and a rigid backing plate.
Figure 3:
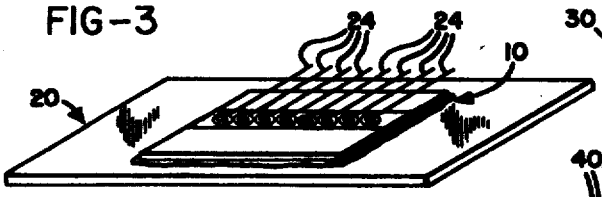
FIG. 3 is a pictorial illustration of the glass nozzle array embodiment of FIG. 1 secured to the rigid backing plate illustrated in FIG. 2.

As an example of the construction of either a charge plate or an orifice plate, the construction of a charge plate using the glass nozzle array 10 is illustrated in FIGS. 2 and 3. The glass nozzle array 10 is secured to a rigid backing plate 20 having a central elongated opening 22 defined therein coextensive with the pattern of nozzles 16 on the glass nozzles and through the backing plate onto the material being printed. It is possible, depending upon the diamter of the holes in the nozzles 16 and the distance between centers of the nozzles, to utilize individual drilled holes in rigid backing plate 20 in lieu of the elongated opening 22.

To assemble the glass nozzle array 10 and rigid backing plate 20, the nozzle array was merely placed over the opening 22 in proper alignment therewith and then adhered by an epoxy resin of other suitable material to the rigid backing plate 20, as illustrated in FIG. 3. In the case of the charge plate assembly, a further step of applying a printed circuit pattern 24 to the glass nozzle array 10 in the form of a plurality of ring-like members about each of the nozzles 16, is performed.

As is well known in the art, the printed circuit pattern 24 forming the ring-like members around the nozzle 16 and extending cylindrically as a liner through each nozzle is utilized to selectively charge the droplets which pass through the openings in nozzles 16.

Figure 5:
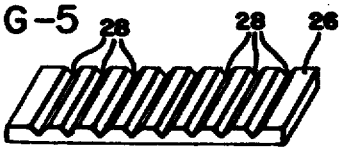
FIG. 5 is a pictorial illustration of a tube support member used to maintain the glass tubes in proper alignment during forming of the sandwich construction of FIG. 4.

Referring now to the manner in which the glass nozzle array 10 is formed, 100 orientation silicon wafer is etched and subsequently processed to form parallel V-grooves (or flat bottomed V-grooves) of the desired pitch in order to support the individual glass tubes at the proper spacing between centers. An explanation of how this etching and processing is performed is provided by A. I. Stoler in an article entitled "The Etching of Deep Vertical-Walled Patterns in Silicon", RCA Review, June 1970, pages 271–275. The wafer is then split to form the pair of wafers 26 as shown in FIG. 6 with an expanded view of one such wafer shown in FIG. 5.

After the V-grooves 28 are etched into the surface of the silicon wafer 26, the wafers are secured to a frame member 30 of generally rectangular cross section having a rectangular opening 32 defined therein. The silicon wafers 26 are secured to opposite sides of the frame member 30 with respective V-grooves in each wafer 26 aligned and parallel to one another so as to support glass capillary tubes 40 in parallel relation in a common horizontal plane.

A bottom glass plate 42 is then positioned across the frame perpendicular to the positions where the glass tubes 40 will be positioned. Depressions in the end portions 44 and 46 of the frame are provided so that the upper surface of the bottom glass plate 42 will lie below the plane containing the tubes 40 so that the glass plate 42 will not be in contact with the glass tubes. Bottom glass plate 42 is provided with two rectangular spacer members 48 of any suitable material such as a rigid plastic, for providing proper spacing between top and bottom glass plates.

Figure 6:
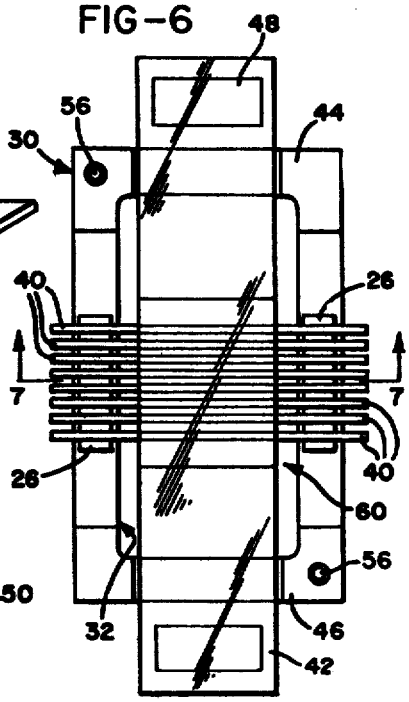
FIG. 6 is a top plan view of a frame structure for supporting the sandwich construction illustrated in FIG. 4.
Figure 4:
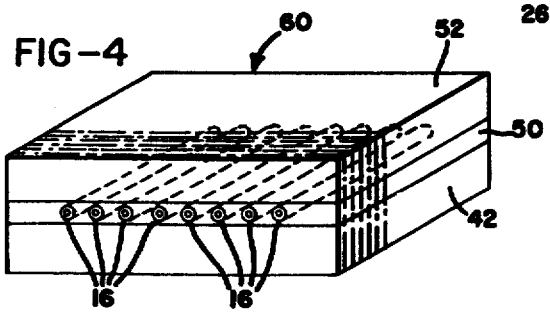
FIG. 4 is a pictorial illustration of the sandwich construction from which the glass nozzle arrays of the embodiment illustrated in FIG. 1 are taken.
Figure 7:
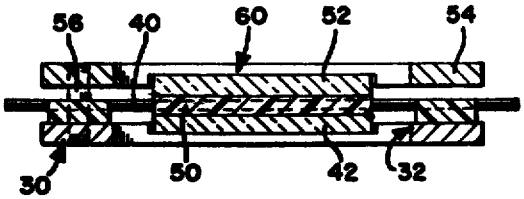
FIG. 7 is a cross sectional view along line 7—7 of FIG. 6.

The glass tubes 40 are then placed with their opposite end portions in respective grooves in each of the aligned silicon wafers 26 to form the array as illustrated in FIG. 6. An epoxy resin 50 is then applied to the tubes 40 and bottom glass plate 42 so that all of the openings between the tubes and between the tubes and the bottom glass plate 42 are completely filled. Care should be taken to avoid air bubbles in the epoxy resin and a sufficient amount of resin must be provided so that it extends above the tubes 40. A top glass slide 52 is then positioned on top of spacers 48 in contact with the upper surface of resin 50 to form the sandwich construction illustrated in FIGS. 4 and 7.

A second frame member 54 is then positioned above frame member 30 in engagement with the top surface of glass plate 52. A pair of locating pins 56 are secured to diagonally opposite corners of frame member 54 and are inserted in corresponding holes 57 in frame member 30 to assist in aligning the two frame members. A weight (not shown) is then placed on top of frame member 52. This maintains an assembly 60 comprising the two glass plates 42 and 52, the epoxy resin 50, and glass tubes 40, in proper alignment while the epoxy resin is curing.

Once the resin 50 has cured the frame members 30 and 54 are disassembled and removed from the assembly 60. The assembly 60 is then placed in a cutting jig and properly positioned for cutting in a cutting apparatus such as a wire saw of the type available from Lazer Technology Inc., North Hollywood, California, designated Model No 2006A, with a 0.01 inch stainless wire and lubricated with a 400 grit silicon carbide powder in a glycerol and water slurry. The assembly 60 is cut so that the thin slices forming glass nozzle array 10 are cut orthogonal to the length of the glass tubes, thus producing an array as illustrated in FIG. 1.

As an example of how to produce a glass nozzle array 10 for use in an orifice plate, the following description is provided.

In order to produce glass capillary tubes 40 of the appropriate inside diameter, commercially available capillary tubing, for example, having a nominal inside diameter of 0.02 inch and a nominal outside diameter of 0.2 inch was obtained and heated and drawn to approximately 20:1 reduction ratio to produce a capillary tubing having an inside diameter of approximately 0.0009 inch and an outside diameter of 0.010 inch.

The type of glass from which the capillary tubing can be made is not critical, except that it must be compatable with the inking materials and with the epoxy resin being utilized to form the glass nozzle array. Two types of glass that have proven to be suitable for such use are Pyrex glass, Code No. 7740 sold by Corning Glass Works and Kimex, designated KG-33, sold by Kimble Glass Company.

Likewise, the glass material forming bottom glass plate 42 and top glass plate 52 is not particularly critical, except that it must also be compatable with the inking material and the epoxy. In one embodiment a standard microscope slide glass was utilized having a 0.04 to 0.05 inch thickness and 1 by 3 inches in dimensions.

In order to form the V-grooves in the silicon wafers 26, 100 orientation silicon slices obtained from Semi-Conductor Processing Company, Inc., Hingham, Massachusetts were cleaned and then processed using a contact print mask of the necessary dimensions to produce the desired V-grooves for either a 0.020 or 0.0131 inch distance between centers of adjacent glass tubes. For example, given the 54.7° angle of the 111 plane in the silicon and the approximately 100:1 etch ratio, it was determined that a groove width of 0.012 inch and a bottom flat of 0.0011 mil would provide the appropriate support structure for the glass tubes at 0.0131 inch centers. The finished wafers 26 were then secured to the side portions of the frame member 30.

A glass slide forming bottom glass plate 42 was then positioned on the frame member 30 and the glass capillary tubes were positioned in the V-grooves 28 of the silicon wafers 26. An epoxy resin designated Epon 850 or 828, obtainable from Shell Chemical Company Plastics and Resin Division, Downey, California, is then mixed with an appropriate hardener such as DEH-20, obtainable from Dow Chemical Company, Midland, Michigan. The epoxy is then spread through the tubes and onto the bottom glass plate 42, being careful not to create air bubbles in the epoxy. A second slide forming top glass plate 52 is then positioned over the resin and glass tubes and adhered thereto in contact with the epoxy. This assembly is then permitted to cure and is then sliced into a thickness somewhat larger than the desired final thickness, for example, 0.02 inch. The array 10 is then waxed to a polishing disk and in several polishing steps is polished to the desired thickness of approximately 0.002 to 0.003 inch. In order to prevent clogging of the openings in the nozzle it is preferable, at least prior to the polishing step, to place wax in the holes so that the material removed during polishing will not clog the holes. The wax can then be removed after the polishing steps are complete by merely heating the assembly.

The glass nozzle array 10 is then secured to rigid backing plates, made for example of 0.02 inch thick aluminum or stainless steel, with the opening 22 formed therein with a width slightly larger than the openings in the glass nozzles 16.

The glass nozzle array 10 is secured to the backing plate 20 by use of a suitable epoxy such as Torr Seal Vacumm resin obtainable from Varian Associates, Palo Alto, California. Care must be taken to assure the glass nozzle array 10 is sealingly engaged with the backing plate 20 so that inking material will not flow under the edges of the array.

Although the foregoing illustrates the preferred embodiment of the present invention, variations are possible. All such variations as would be obvious to one skilled in this art are intended to be included within the scope of the invention as defined by the following claims.

What is claimed is:

1. A method of forming a glass nozzle array for use in an ink jet printing apparatus as part of an orifice plate, charge ring assembly or the like, the steps comprising:

supporting a plurality of cylindrical glass tubes in spaced parallel alignment;

placing a first plate *in spaced relation* beneath said tubes in a plane parallel thereto;

spreading epoxy resin through the spaces between said tubes and onto the upper surface of said first plate;

placing a second plate *in spaced relation* above said tubes in a plane parallel to said first plate and having a lower surface in contact with said epoxy resin;

curing said resin to form an assembly of said plates, tubes and epoxy;

cutting said assembly orthogonal to the axes of said tubes at a predetermined thickness to form said nozzle array.

2. A method of forming an orifice plate including the steps defined in claim 1 and further comprising:

cutting said assembly to produce said nozzle array with a thickness in the range of about 0.0005 to 0.005 inch; and securing said nozzle array to the surface of a rigid plate having a central opening defined therein and in alignment with the openings in said glass tubes, so that the surface of said nozzle array in contact with said surface of said rigid plate is in sealing engagement therewith.

3. A method as defined in claim 1 wherein said step of supporting said glass tubes includes the step of spacing said tubes each having an outside diameter of about 0.01 inch and an inside diameter of about 0.0009 inch with about 0.020 inch between centers.

4. A method as defined in claim 1 wherein said step of supporting said glass tubes includes the step of spacing said tubes each having an outside diameter of about 0.01 inch and an inside diameter of about 0.0009 inch with about 0.0131 inch between centers.

5. A method as defined in claim 1 wherein said step of supporting said glass tubes includes the step of aligning a pair of spaced support plates containing V-grooves for supporting the ends of said glass tubes, said spaced support plates being separated a distance greater than the width of said first plate and said V-grooves being aligned to support said glass tubes in parallel relation at predetermined equal distance between their central axes.

6. A method as defined in claim 5 and further including the step of forming each said support plate by selectively preferential etching said V-grooves in a wafer of 100 orientation silicon.

7. A method of forming a glass nozzle array for use in an ink jet printing apparatus as part of an orifice plate, charge ring assembly or the like, the steps comprising:

supporting a plurality of cylindrical glass tubes in parallel alignment;

placing a first plate *in spaced relation* beneath said tubes in a plane parallel thereto;

spreading epoxy resin through the spaces between said tubes and onto the upper surface of said first plate;

placing a second plate *in spaced relation* above said tubes in a plane parallel to said first plate and having a lower surface in contact with said epoxy resin;

curing said resin to form an assembly of said plates, tubes and epoxy;

cutting said assembly orthogonal to the axes of said tubes to produce said nozzle array with a thickness in the range of about 0.010 to 0.050 inch;

securing said nozzle array to the surface of a rigid plate having a central opening defined therein and in alignment with the openings in said glass tubes, so that the surface of said nozzle array in contact with said surface of said rigid plate is in sealing engagement therewith; and depositing conductive material on said nozzle assembly in a predetermined form so as to produce a printed circuit for placing an electrical charge around each of said openings in said tubes.

8. A method of forming a glass nozzle array for use in an ink jet printing apparatus as part of an orifice plate, charge ring assembly or the like, the steps comprising:

heating [each said tube] *a plurality of glass tubes each* having an initial outside diameter of about 0.2 inch and an inside diameter of about 0.02 inch;

drawing each said tube so as to have an outside diameter of about 0.01 inch and an inside diameter of about 0.0009 inch;

supporting a plurality of [cylindrical glass] *said* tubes in parallel alignment;

placing a first plate *in spaced relation* beneath said tubes in a plane parallel thereto;

spreading epoxy resin through the spaces between said tubes and onto the upper surface of said first plate;

placing a second plate *in spaced relation* above said tubes in a plane parallel to said first plate and having a lower surface in contact with said epoxy resin;

curing said resin to form an assembly of said plates, tubes and epoxy; and cutting said assembly orthogonal to the axes of said tubes at a predetermined thickness to form said nozzle array.

9. A method of forming a glass nozzle array for use in an ink jet printing apparatus as part of an orifice plate, charge ring assembly or the like, the steps comprising:

supporting a plurality of cylindrical glass tubes in parallel alignment by placing on a bottom support frame a pair of spaced support plates containing V-grooves for supporting the ends of said glass tubes, said spaced support plates being separated a distance greater than the width of said first plate and said V-grooves being aligned to support said glass tubes in parallel relation at predetermined equal distances between their central axes, each said support plate being formed by selectively preferential etching said V-grooves in a wafer of 100 orientation silicon;

placing a first plate beneath said tubes in a plane parallel to said tubes and supported by said bottom support frame, said first plate being supported between said support plates so that the upper surface of said first plate is disposed below the bottom of said V-grooves;

spreading epoxy resin through the spaces between said tubes and on to the upper surface of said first plate;

placing spacers on said first plate on opposed sides of said plurality of tubes;

placing a second plate above said tubes and supported by said spacers in a plane parallel to said first plate and having a lower surface in contact with said epoxy resin;

securing a top clamping frame to said bottom support frame and clamping engagement with said second plate;

curing said epoxy resin to form an assembly of said plate, tubes and epoxy resin;

removing said assembly from said top and bottom frames; and cutting said assembly orthogonal to the axis of said tubes at a predetermined thickness to form said nozzle array.

10. A method of forming a glass nozzle array for use in an ink jet printing apparatus as part of an orifice plate, charge ring assembly or the like, the steps comprising:

supporting a plurality of cylindrical glass tubes in parallel alignment by supporting said tubes at their outer end portions on support plates containing parallel aligned V-grooves;

placing a first plate beneath said tubes in a plane parallel thereto;

spreading epoxy resin through the spaces between said tubes and on to the upper surface of said first plate;

placing a second plate above said tubes in a plane parallel to said first plate and having a lower surface in contact with said epoxy resin;

using means for supporting said second plate a predetermined parallel distance from said first plate and for holding said support plates to that said tubes remain in fixed relation to said first and second plates;

curing said resin to form an assembly of said plates, tubes and resin; and cutting said assembly orthogonal to the axes of said tubes at a predetermined thickness to form said nozzle array.

11. The method as defined in claim 10 wherein after said curing step includes the step of:

removing said means for supporting said first and second plates.

12. A method as defined in claim 10 wherein said support plates are secured to a bottom frame member and supporting said first plate on said bottom frame member so that the upper surface of said plate is disposed below the bottom of said V-grooves;

placing spacers on said first plate on opposed sides of said plurality of tubes;

after said step of spreading said epoxy resin, placing said second plate on said spacers;

securing a top clamping frame member to said bottom frame member in engagement with said second plate; and removing said top and bottom frame members after said curing step.

13. A glass nozzle array for use in an ink jet printing apparatus as part of an orifice plate, charge plate or the like, comprising:

a plurality of cylindrical glass tubes disposed in spaced parallel relation;

a pair of parallel glass plates one disposed above and another disposed below said tubes in [spaced] planes parallel to *and in spaced relation to* said tubes; and epoxy resin securing said plates and glass tubes together.

14. An orifice plate including the glass nozzle array defined in claim 13, and further including:

a rigid backing plate having a central elongated opening defined therein disposed in alignment with the openings in said glass tube;

said glass nozzle array having a bottom surface orthogonal to said tubes in sealing engagement with a top surface of said orifice plate.

15. An orifice plate as defined in claim 14 wherein the thickness of said glass nozzle array in the direction of the length of said tubes is in the range of about 0.0005 to 0.005 inch.

16. An orifice plate as defined in claim 15 wherein said glass tubes have an inside diameter of about 0.0009 inch.

17. An orifice plate as defined in claim 16 wherein said glass tubes are spaced with the distance between centers of adjacent tubes in the range of about 0.010 to 0.020 inch.

18. A glass nozzle array for use in an ink jet printing apparatus as part of an orifice plate, charge plate or the like, comprising:

a plurality of cylindrical glass tubes disposed in spaced parallel relation;

a pair of parallel glass plates one disposed above and another disposed below said tubes in [spaced] planes parallel to *and in spaced relation to* said tubes;

epoxy resin securing said plates and glass tubes together;

a rigid backing plate having a central elongated opening defined therein disposed in alignment with the openings in said glass tubes;

said glass nozzle array having a bottom surface orthogonal to said tubes in sealing engagement with a top surface of said orifice plate; and a printed circuit means of predetermined configuration and formed of electrically conductive material secured to said nozzle array for selectively placing electrical charges around each opening in each said tube.

19. A charge plate as defined in claim 18 wherein the thickness of said glass nozzle array in the direction of length of said tubes is in the range of about 0.010 to 0.050 inch.

20. A charge plate as defined in claim 19 wherein said glass tubes have an inside diameter in the range of about 0.005 to 0.010 inch.

* * * * *